(12) United States Patent
Hazanovich et al.

(10) Patent No.: US 10,528,208 B2
(45) Date of Patent: Jan. 7, 2020

(54) INSTANTANEOUS PREVIEW OF A DATA STREAM WITH NON-LINEAR TIME WARPING

(71) Applicant: International Business Machines Corporation, Armonk, NY (US)

(72) Inventors: Evgeny Hazanovich, Haifa (IL); Dror Porat, Haifa (IL)

(73) Assignee: International Busines Machines Corporation, Armonk, NY (US)

(*) Notice: Subject to any disclaimer, the term of this patent is extended or adjusted under 35 U.S.C. 154(b) by 700 days.

(21) Appl. No.: 14/726,532

(22) Filed: May 31, 2015

(65) Prior Publication Data

US 2016/0349930 A1  Dec. 1, 2016

(51) Int. Cl.
*G06F 3/0481* (2013.01)
*G11B 27/10* (2006.01)
*G11B 27/28* (2006.01)
*G06F 3/0485* (2013.01)
*G06F 16/783* (2019.01)

(52) U.S. Cl.
CPC .......... *G06F 3/0481* (2013.01); *G06F 3/0485* (2013.01); *G06F 16/783* (2019.01); *G11B 27/105* (2013.01); *G11B 27/28* (2013.01)

(58) Field of Classification Search
CPC .......................... G06F 3/0481; G06F 3/04842
See application file for complete search history.

(56) References Cited

U.S. PATENT DOCUMENTS

| | | | |
|---|---|---|---|
| 8,307,399 B2 | 11/2012 | Lee | |
| 8,599,316 B2 | 12/2013 | Deever | |
| 8,799,253 B2 | 8/2014 | Valliani et al. | |
| 2007/0168867 A1* | 7/2007 | Hiroi | G06F 17/30787 715/723 |
| 2008/0115083 A1* | 5/2008 | Finkelstein | G06F 16/954 715/805 |
| 2009/0172543 A1* | 7/2009 | Cronin | G06F 3/04847 715/721 |
| 2013/0174197 A1 | 7/2013 | Gunatilake | |

OTHER PUBLICATIONS

Andreas Girgensohn et al., "Keyframe-Based User Interfaces for Digital Video", p. 64, 2001, Can be found at: http://www.fxpal.com/publications/keyframe-based-user-interfaces-for-digital-video.pdf.
Anita Kumlodi et al., "Key frame preview techniques for video browsing", Proceedings of the 3rd ACM International Conference on Digital Libraries, Jun. 23-26, 1998, Pittsburgh, PA, USA, p. 119.

* cited by examiner

*Primary Examiner* — Seth A Silverman
(74) *Attorney, Agent, or Firm* — Dvir Gassner

(57) ABSTRACT

A method for previewing a data stream, comprising: extracting multiple samples from a data stream at multiple different sampling rates, wherein each sampling rate corresponds to a different relevance score associated with a different portion of the data stream; using the multiple extracted samples to create a representation of the data stream comprising multiple thumbnails, wherein the representation is weighted in accordance with the multiple different relevance scores; mapping, in accordance with a relevance based mapping scheme, the representation onto a gauge provided with the data stream; and displaying one of the multiple thumbnails in accordance with the relevance based mapping scheme, responsive to detecting a navigation indication on the gauge.

15 Claims, 6 Drawing Sheets

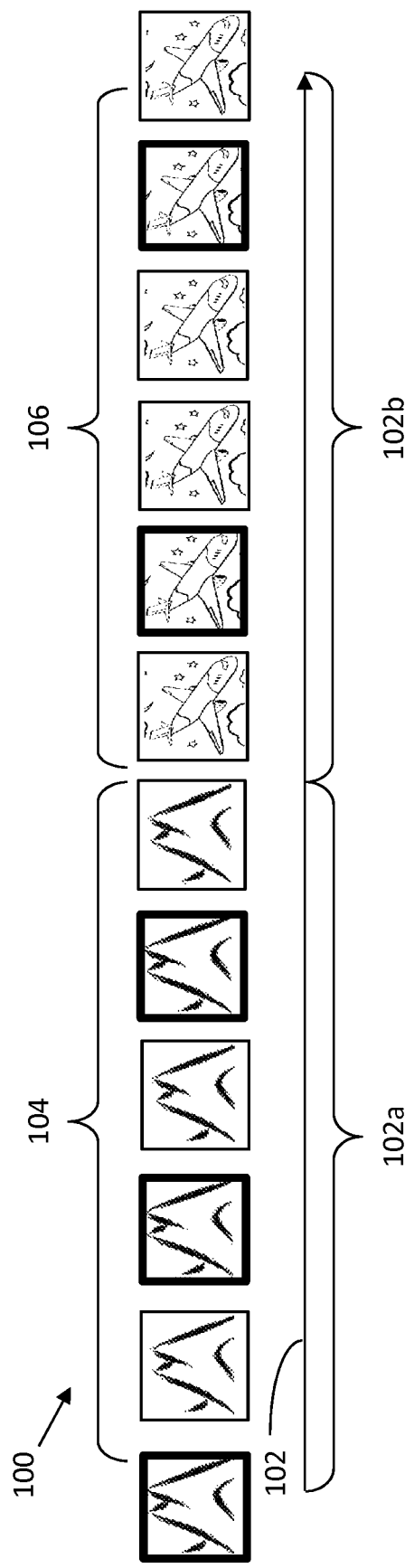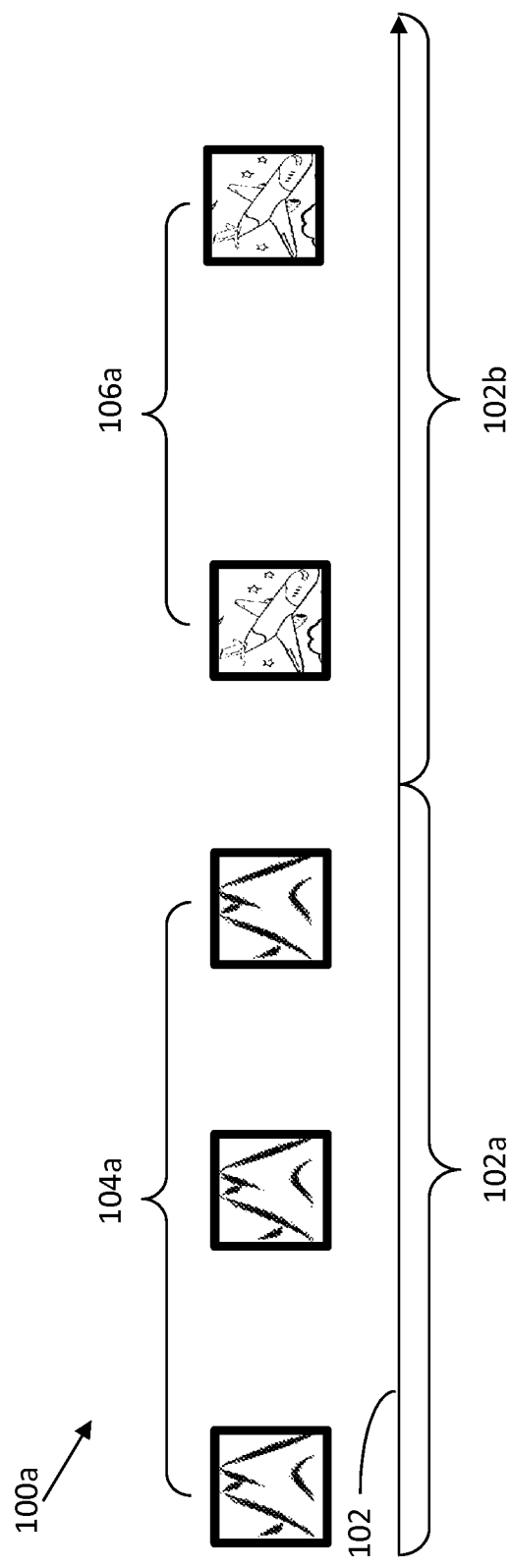
FIG. 1A
FIG. 1B

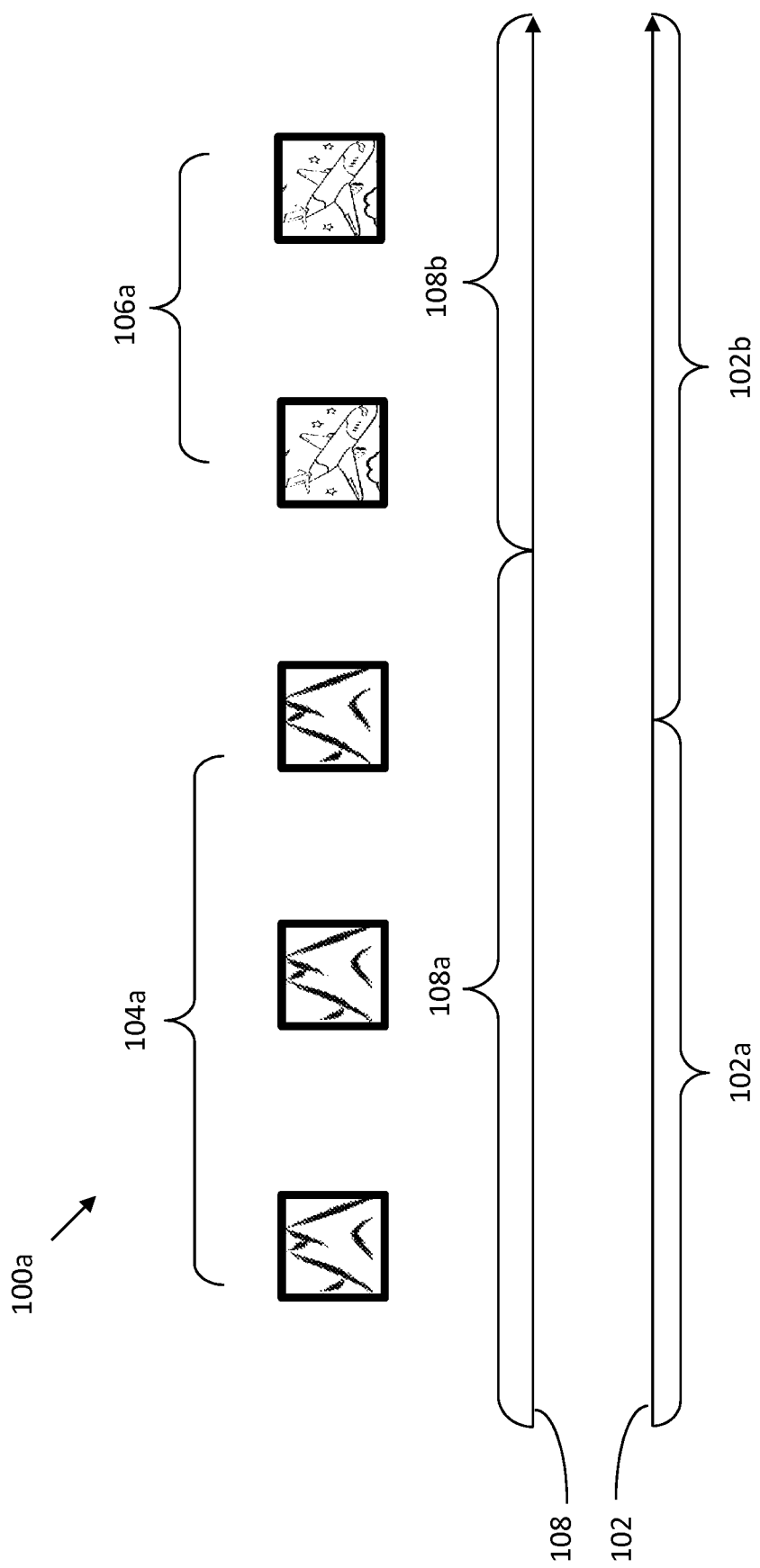

INSTANTANEOUS PREVIEW OF A DATA STREAM WITH NON-LINEAR TIME WARPING

BACKGROUND

The invention relates to the field of previewing multimedia data.

With the proliferation of video content, methods for providing thumbnail representation of such content are essential for efficient video management and browsing. Thumbnails are typically created by sampling representative frames from temporal segments, or scenes of a video stream, and creating lower resolution versions of those frames. The thumbnails provide a reduced-bandwidth format to identify and organize the video stream.

Many video players are provided with a time bar that graphically displays the timely progress of a rendering of the video stream by the video player. The sequence of the frames is of the video stream is uniformly mapped onto the time bar, such that any fraction of video stream that has been rendered is indicated by an equivalent shaded or highlighted fraction of the time bar. For example, if half the video stream has been rendered, half the time bar may be shaded. As a user scrolls across a location on the time bar, such as by using a mouse pointer, one or more thumbnails associated with the video stream portion corresponding to the location may be displayed.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for previewing a data stream, comprising using at least one hardware processor for: extracting multiple samples from a data stream at multiple different sampling rates, wherein each sampling rate corresponds to a different relevance score associated with a different portion of the data stream; using the multiple extracted samples to create a representation of the data stream comprising multiple thumbnails, wherein the representation is weighted in accordance with the multiple different relevance scores; mapping, in accordance with a relevance based mapping scheme, the representation onto a gauge provided with the data stream; and displaying one of the multiple thumbnails in accordance with the relevance based mapping scheme, responsive to detecting a navigation indication on the gauge.

In one embodiment, the method further comprises calculating the relevance scores in accordance with one or more of: a geographic location, a visual motif derived from the data stream, an audio motif derived from the data stream, and metadata derived from the data stream.

In one embodiment, the relevance based mapping scheme uniformly distributes the display of the thumbnails across the length of the gauge.

In one embodiment, the method further comprises indicating, by positioning a progress indicator on a time bar, a timely progression of rendering the data stream on the video player in accordance with a time based mapping scheme, wherein the time based mapping scheme is different than the relevance based mapping scheme; and, responsive to detecting a selection of the displayed thumbnail, rendering the data stream on the application starting from a frame of the data stream corresponding to the selected thumbnail, and positioning the progress indicator on the time bar at a position corresponding to the time-stamp of the selected thumbnail.

In one embodiment, the display of the gauge is overlaid on the display of the time bar.

In one embodiment, the display of the gauge is separate from the display of the time bar.

There is provided, in accordance with an embodiment, a computer program product comprising a non-transitory computer-readable storage medium having program code embodied therewith, the program code executable by at least one hardware processor to: extract multiple samples from a data stream at multiple different sampling rates, wherein each sampling rate corresponds to a different relevance score associated with a different portion of the data stream; use the multiple extracted samples to create a representation of the data stream comprising multiple thumbnails, wherein the representation is weighted in accordance with the multiple different relevance scores; map, in accordance with a relevance based mapping scheme, the representation onto a gauge provided with the data stream; and display one of the multiple thumbnails in accordance with the relevance based mapping scheme, responsive to detecting a navigation indication on the gauge.

In one embodiment, the program code is further executable to calculate the relevance scores in accordance with one or more of: a geographic location, a visual motif derived from the data stream, an audio motif derived from the data stream, and metadata derived from the data stream.

In one embodiment, the relevance based mapping scheme uniformly distributes the display of the thumbnails across the length of the gauge.

In one embodiment, the program code is further executable to indicate, by positioning a progress indicator on a time bar, a timely progression of rendering the data stream on the video player in accordance with a time based mapping scheme, wherein the time based mapping scheme is different than the relevance based mapping scheme; and, responsive to detecting a selection of the displayed thumbnail, render the data stream on the application starting from a frame of the data stream corresponding to the selected thumbnail, and position the progress indicator on the time bar at a position corresponding to the time-stamp of the selected thumbnail.

In one embodiment, the display of the gauge is overlaid on the display of the time bar.

In one embodiment, the display of the gauge is separate from the display of the time bar.

There is provided, in accordance with an embodiment, a system comprising: (i) a storage device having stored thereon instructions for: extracting multiple samples from a data stream at multiple different sampling rates, wherein each sampling rate corresponds to a different relevance score associated with a different portion of the data stream, using the multiple extracted samples to create a representation of the data stream comprising multiple thumbnails, wherein the representation is weighted in accordance with the multiple different relevance scores, mapping, in accordance with a relevance based mapping scheme, the representation onto a gauge provided with the data stream, and displaying one of the multiple thumbnails in accordance with the relevance based mapping scheme, responsive to detecting a navigation indication on the gauge; and (ii) at least one hardware processor configured to execute said instructions.

In one embodiment, the non-transient storage device further includes instructions for calculating the relevance scores in accordance with one or more of: a geographic location, a visual motif derived from the data stream, an audio motif derived from the data stream, and metadata derived from the data stream.

In one embodiment, the relevance based mapping scheme uniformly distributes the display of the thumbnails across the length of the gauge.

In one embodiment, the non-transient storage device further includes instructions for indicating, by positioning a progress indicator on a time bar, a timely progression of rendering the data stream on the video player in accordance with a time based mapping scheme, wherein the time based mapping scheme is different than the relevance based mapping scheme; and, responsive to detecting a selection of the displayed thumbnail, rendering the data stream on the application starting from a frame of the data stream corresponding to the selected thumbnail, and positioning the progress indicator on the time bar at a position corresponding to the time-stamp of the selected thumbnail.

In one embodiment, the display of the gauge is overlaid on the display of the time bar.

In one embodiment, the display of the gauge is separate from the display of the time bar.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 1A-D, taken together, are a schematic illustration of a method to represent a video stream, in accordance with an embodiment;

DETAILED DESCRIPTION

Figure 1D:
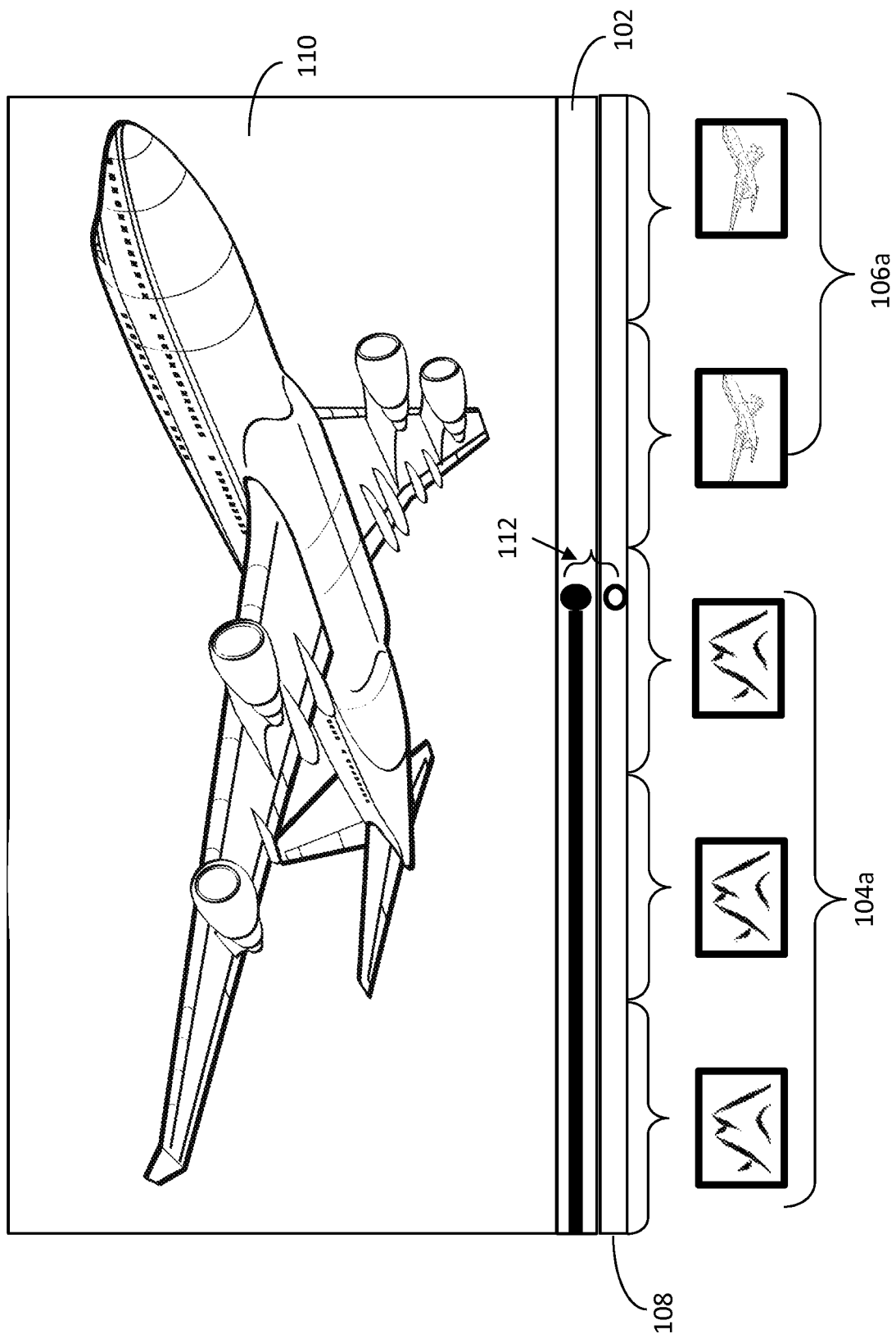

A method, and system and a computer program product are disclosed herein for previewing a data stream in accordance with a relevance score corresponding to an attribute of interest, such as a geographic location, facial and/or voice identity to name a few. The data stream may be sampled according to the relevance score, with a higher sampling rate applied to sections with a high relevance score, and a lower sampling rate applied to sections with a low relevance score, to yield a non-uniform representation that is weighted in favor of the more relevant portions of the data stream. The representation is mapped onto a gauge, such as a time bar, provided with a video and/or audio player, allowing a user to view it by navigating across the time bar, thereby displaying a greater proportion of relevant previews and a lesser proportion of irrelevant previews.

In one embodiment, the data stream may be a video stream and the representation may be comprised of 'thumbnails', or lower resolution versions of higher resolution frames extracted from the video stream. In another embodiment, the data stream may be an audio stream and the samples may be selected audio samples of the audio stream. In another embodiment, the data stream may be packetized data, and the samples may be selected packets.

In the description that follows. The term 'thumbnail' refers to any suitable representation for previewing, or pre-rendering the data stream, and may comprise any data type corresponding to the underlying data stream, such as any combination of graphic, or audio data. Similarly, the term 'gauge' refers to any suitable graphic user interface (GUI) element that indicates a relative position of the thumbnail with respect to the data stream, such as in accordance with a timestamp of the thumbnail. Although some of the examples described herein refer to the gauge as a time bar, it is to be understood that is for exemplary purposes only and is non-limiting. The gauge may be a linear gauge, or a dial, or any other suitable GUI indication element.

For example, a user may preview a video retrieved via a search by loading it onto a video player configured with a user end-point device, mapping a weighted thumbnail representation of the video onto the time bar of the video player according to the relevance scores, and navigating across the time bar to display the thumbnails. Due to the higher sampling rate of the more relevant portions, the display of the thumbnails is weighted in favor of the more relevant portions, providing the user with a more relevant preview. At any point, the user may click on a displayed thumbnail to jump to the corresponding portion of the video and play it on the video player. The thumbnails may optionally display a time-stamp corresponding to the thumbnail's position in the video stream.

In one embodiment, the representation may be scaled, or weighted, in accordance with an attribute derived from metadata associated with the data stream. For example, video segments, or 'scenes', of a video stream associated with a user specified geographic location may be weighted with a high relevance score, and sampled at a higher rate than scenes that are not associated with that geographic location, and which are therefore weighted with a low relevance score, yielding a dense representation for highly relevant segments, and a sparse representation for less relevant segments. Alternatively, visual and/or audio recognition software may be applied to scale sampling rates of the data stream in accordance with a match to a particular visual and/or sound motif, such as may be identified with a particular individual or entity, to produce a dense representation for segments that include the motif, and sparse representations for segments that do not include the motif.

By adapting the sampling rate in accordance with the relevance scores, the resulting representation may be weighted in favor of more relevant segments, and may be sparser for less relevant segments, and thus, may provide a useful resource for previewing multiple data streams.

For example, a 10 minute long video stream may include two scenes: a first scene lasting 2.5 minutes, from time 0 to minute 2.5, and a second scene lasting 7.5 minutes, from minute 2.5 to minute 10. The first scene may have a higher relevance score, and may be sampled at a higher rate of one thumbnail every 10 seconds to yield 15 representative thumbnails for the first 2.5 minutes of the video stream, whereas the second scene may have a lower relevance score, and may be sampled at a lower rate of one thumbnail every 1.5 minutes, yielding 5 representative thumbnails for the final 7.5 minutes of the video stream.

In one embodiment, the non-uniformly sampled representation is mapped onto a the length of the gauge in proportion to the respective relevance scores, to yield a uniform number of thumbnails displayed per unit distance of the gauge. Thus, using the example above, the 15 thumbnails representing the first scene comprising only a quarter of the video, is 'stretched' for uniform display across the first three quarters of the gauge, and the 5 thumbnails representing the second scene comprising three quarters of the video, is 'compressed' for uniform display across the last quarter of the gauge.

Thus, even though the first scene comprises only a quarter of the video, due to its higher relevance score, its thumbnails span three quarters of the preview. Conversely, the second scene comprises a three quarters of the video, but due to its lower relevance score, its thumbnails span only a quarter of the preview.

In an embodiment, the gauge GUI element is separate from the time bar GUI element that is provided with the video player. The thumbnails may be mapped onto the gauge in accordance with a relevance based mapping scheme that is proportional to the relevance scores, and displayed responsive to detecting a navigation by the user on the gauge, whereas the timely progression of rendering the video may be separately indicated on the time bar using conventional methods, in accordance with a uniform time based mapping scheme corresponding to the timely progression. Thus, the video may be rendered on the video player using conventional methods with the timely progression indicated on the time bar provided with the video player, whereas navigating over the gauge may display the thumbnails, as described above. The relevance based mapping scheme may preserve the timestamp-based order of the thumbnails.

Alternatively, the gauge GUI element is displayed overlaid on the time bar GUI element.

In another embodiment, both the first and the second mapping schemes may be applied to the same GUI element, and therefore the gauge comprises time bar. The first mapping scheme may be proportional to the relevance scores, and may be applied to display the thumbnails across the time bar for previewing the data stream. The second mapping scheme may be directly proportional to the timely progression of rendering the data stream, and may be applied to indicate the progress of rendering the data stream on the video player. Thus, a given position along the time bar may correspond to multiple time stamps: a first time-stamp corresponding to the thumbnail mapped to that given position using the first mapping scheme, and a second time-stamp indicating the progress of rendering the data stream on the player.

In an embodiment, selecting the displayed thumbnail may cause the player to render the data stream starting from the time corresponding to the time-stamp of the selected thumbnail. The progress indicator along the time bar may be repositioned to correspond to the time-stamp of the selected thumbnail, and the data stream may be rendered using conventional methods.

Referring to the example above, navigating over the mid-point of the gauge results in displaying a thumbnail extracted from the first 2.5 minutes of the video. Clicking on the displayed thumbnail causes the video player to render the video starting from the time-stamp of the displayed thumbnail and reposition the progress indicator on the time bar, accordingly. This allows the user to view the relevant portions of the video corresponding to the previewed thumbnail.

Reference is now made to FIG. 1A, which illustrates a system and method for representing a video stream 100, in accordance with an embodiment. It may be noted that the system and methods are described below as applied to a video stream for exemplary purposes only, and that they may be equally applied to any suitable data stream including any combination of audio, video, text, and/or other data types.

Video stream 100, which comprises multiple frames, may be provided for rendering in a video player. A time bar 102 may be provided with the video player to graphically indicate the timely progress of the rendering of the video stream on the video player. Video stream 100 may be mapped onto time bar 102 in direct proportion to the duration of rendering video stream 100. Thus, a video segment comprising a given fraction of video stream 100 may be mapped onto a similar fraction along time bar 102.

At least a portion of the frames included in video stream 100 may be ranked in accordance with a user-defined parameter, such as a geographical location, date, and/or one or more visual and/or audio motifs, to name a few, and that may be derived from metadata associated with video stream 100. In another embodiment, the ranking may be performed by applying image and/or audio recognition software to identify the one or more visual and/or audio motifs, such as may correspond to a particular individual, represented in video stream 100.

The ranks may be applied, using conventional methods, to cluster the frames of video stream 100 into multiple scenes, such as scene 104 and scene 106, each assigned with a relevance score that is calculated as a function of the ranks of the frames included in each scene, accordingly, and thus, dependent on the parameter defined above In an embodiment, any known feature extraction technique may be used to rank and cluster video stream 100 into multiple scenes 104 and 106 in accordance with the parameter.

The video stream may be sampled at a non-uniform frame-per-unit-time rate to create a non-uniformly sampled thumbnail representation of the video stream, by sampling each of multiple scenes 104 and 106 of video stream 100 at different sample rates calculated as a function of each scene's respective relevance score. For example, scene 104 may be sampled at a first sampling rate calculated as a function of a first relevance score assigned to scene 104, and scene 106 may be sampled at a second sampling rate calculated as a function of a second relevance score assigned to scene 106.

Referring to FIG. 1B, the frames extracted by sampling each of scenes 104 and 106 at the different sampling rates may be compiled to create thumbnail representations 104*a* and 106*a* of scenes 104 and 106, respectively, weighted according to each scene's respective relevance score.

The resulting thumbnail representation may be mapped onto a gauge 108 that is provided to display the thumbnails representing video stream 100, responsive to a navigation indication on the time bar, such as by detecting a cursor scroll, a touch-screen swipe and/or other indicator by a user interface. The thumbnails may be mapped, in accordance with the relevance-based mapping scheme to uniformly distribute their display across the length of gauge 108. Upon detecting a navigation indication on gauge 108, a thumbnail representation may be displayed in accordance with the relevance-based mapping scheme.

In the case where gauge 108 comprises the same GUI element as time bar 102, the same GUI element may serve two different roles simultaneously, in accordance with two different mapping schemes: 1) previewing the thumbnails in accordance with the relevance-based mapping scheme, and 2) indicating a timely progression of the video in accordance with a uniform time-based mapping scheme.

In one embodiment, the weighted thumbnail representation may be computed remotely and retrieved as a separate file with the data stream. In another embodiment, the weighted thumbnail representation may be derived locally at the user end-point device. The thumbnail representation may be stored as an adjunct file in association with the video stream.

For example, referring to FIG. 1B, a user may define geographic proximity to the location "ski resort at Lake Tahoe" as a parameter for weighting the thumbnail representation of video stream 100. The geographical location metadata associated with selected frames of video sequence 100, shown in FIG. 1A in bold, may be used to cluster sequence 100 into scenes 104 and 106. The location metadata of scene 104 may match 'ski resort at Lake Tahoe' and thus, scene 104 may be assigned a high relevance score. Conversely, the location metadata of scene 106 may point to 'Reno-Tahoe international airport', and thus, due to the poor match with the parameter, scene 106 may be assigned a low relevance score.

Scenes 104 and 106 may be sampled at different rates, as described above, where the highly relevant scene 104 may be sampled at a higher rate that the less relevant scene 106, yielding a non-uniform thumbnail representation 100a for video stream 100. Specifically, scene 104 comprising six frames, whose metadata of 'Lake Tahoe ski resort' is strongly correlated to the parameter, may have a higher relevance score, resulting in a higher sampling rate of 50%, to yield a thumbnail representation comprising three thumbnails 104a. Conversely, scene 106 comprising six frames, whose metadata of 'Reno-Tahoe international airport' may have a weaker correlation with the target attribute, may have a lower relevance score and may be sampled at a lower rate of 30% to yield a thumbnail representation comprising only two thumbnails 106a.

Referring to FIG. 1C, representation 100a may be mapped onto gauge 108 in a manner to provide a uniform thumbnail rate per-unit-distance of gauge 108. Thus, thumbnails 104a are mapped onto ⅗ of gauge 108, indicated by portion 108a, and thumbnails 106b are mapped onto ⅖ of gauge 108, indicated by portion 108b. By comparison, the timely progression of rendering scene 104, represented by thumbnails 104a is indicated on one half of time bar 102, indicated by portion 102a, and the timely progression of rendering scene 106, represented by thumbnails 106a is indicated on the other half of time bar 102, indicated by portion 102b.

In the embodiment where the display of gauge 108 is superimposed, or overlaid on time-bar 102, there is a non-linear correspondence or 'time-warp' between the position at which a thumbnail is displayed for preview, and the respective position for indicating the progress of rendering the video at a time corresponding to the timestamp of the thumbnail.

Reference is now made to FIG. 1D which is a conceptual illustration for displaying and/or previewing a video, in accordance with an embodiment. FIG. 1D illustrates time bar 102 and gauge 108 displayed as a separate GUI elements. However, as discussed above, gauge 108 may be displayed superimposed on 102, or alternatively, time bar 102 may be configured to operate both as a conventional time bar and as gauge 108.

Video 100 may be provided for rendering on a display screen 110 provided with the video player. The timely progress of rendering of video 100 is indicated on time bar according to a uniform time-based scale, and the thumbnail representation is displayed along gauge 108 according to a relevance-based scale, which is different than the time-base scale.

Thus, an indication along time bar 102 of a position 112, located on the second half of time bar 102, corresponds to rendering the second half of video 100, namely scene 106 showing frames of 'Reno-Tahoe international airport' on display 110. Whereas, a navigation indication by a user at the same position 112 along gauge 108 results in previewing one of the 'Lake Tahoe Ski Resort' thumbnails 104a, corresponding to scene 104 of video 100. A selection by the user of the displayed thumbnail causes video 100 to be rendered at the time stamp corresponding to the displayed thumbnail, and causes the time indicator of time-bar to adjust, accordingly.

Figure 2A:
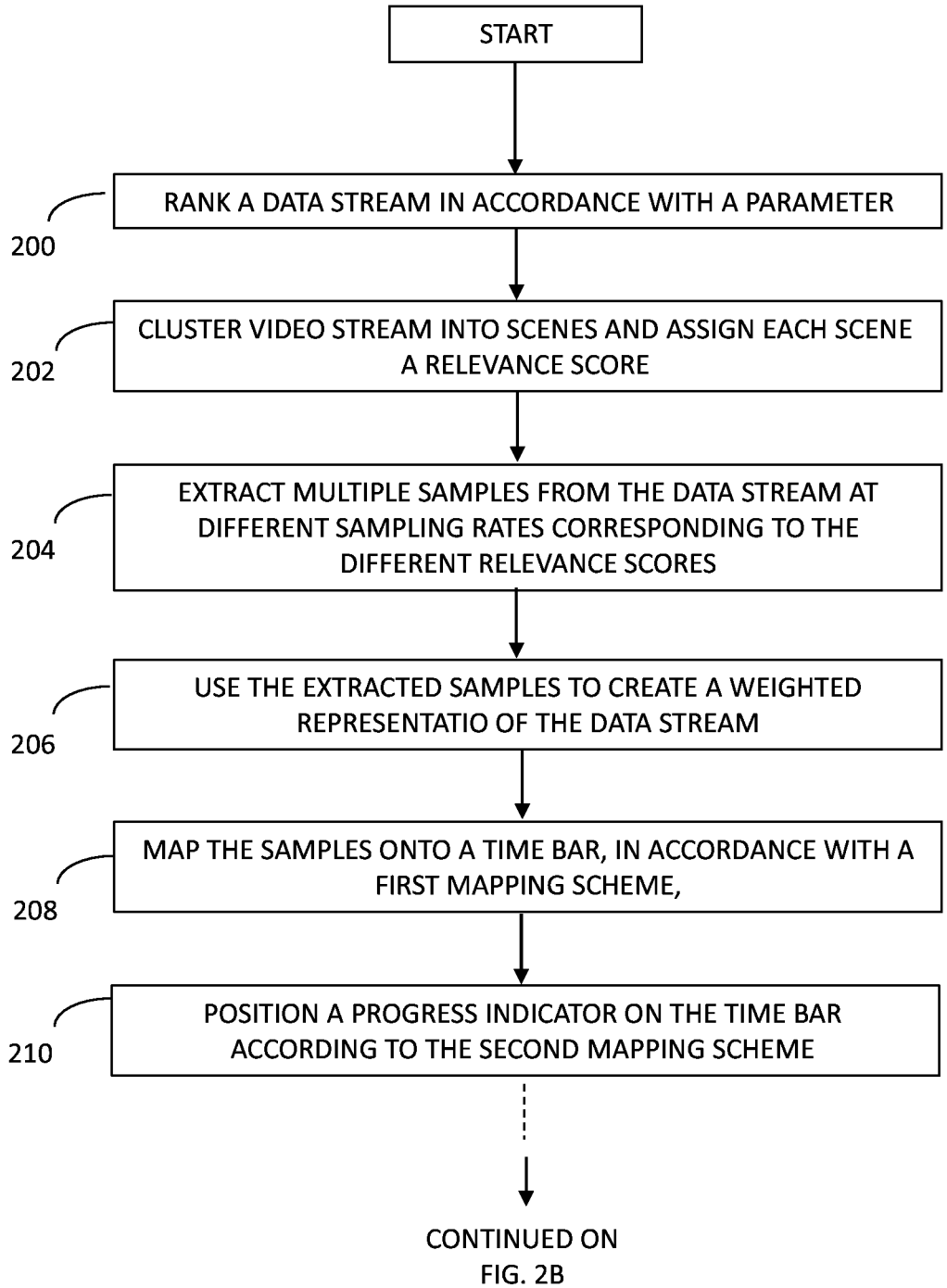
FIGS. 2A-B, taken together, are a flowchart of a method to represent a video stream, in accordance with an embodiment.
Figure 2B:
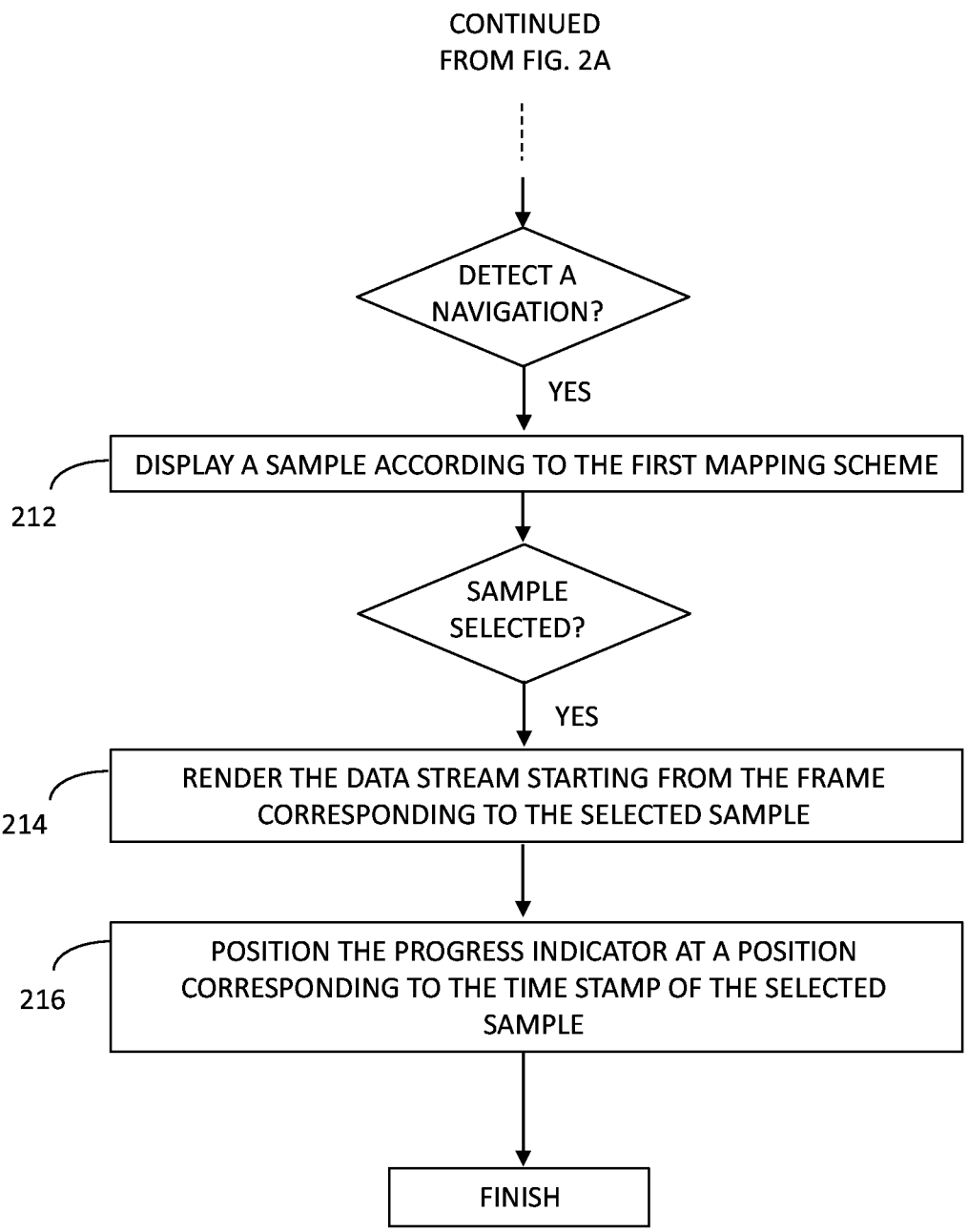

Reference is now made to FIG. 2 which is a flowchart of a method to preview a data stream, in accordance with an embodiment. A data stream may be ranked in accordance with a parameter, such as proximity to a geographical location, date, and/or any other feature that may be extracted from the data stream and/or any associated metadata (Step 200). The data stream may be clustered into multiple segments, in accordance with the ranking, and each segment may be assigned a relevance score calculated in accordance with the ranks of the samples included in that segment (Step 202). In an embodiment, the data stream may comprise a video stream, and the segments may comprise scenes of the video stream.

Multiple samples may be extracted from the data stream at multiple different sampling rates each of which corresponds to one of the different relevance scores (Step 204). The multiple extracted samples may be used to create a representation of the data stream comprising multiple thumbnails, where the representation is weighted in accordance with the multiple different relevance scores (Step 206). The representation may be mapped, in accordance with a relevance based mapping scheme, onto a gauge provided with the data stream (Step 208). In an embodiment, the relevance based mapping scheme may uniformly distribute the display of the samples across the length of the gauge.

A progress indicator may be positioned on a time bar to indicate a timely progression of rendering the data stream on the video player in accordance with a time based mapping scheme, where the time based mapping scheme is different than the relevance based mapping scheme (Step 210). Responsive to detecting a navigation indication on the gauge, one of the multiple thumbnails may be displayed in accordance with the relevance based mapping scheme (Step 212). Responsive to detecting a selection of the displayed thumbnail, the data stream may be rendered on the application starting from a frame of the data stream corresponding to the selected thumbnail (Step 214), and the progress indicator may be positioned on the time bar at a position corresponding to the time-stamp of the selected thumbnail (Step 216).

In an embodiment, the relevance scores may be calculated in accordance with one or more of: a geographic location, a visual motif derived from the data stream, an audio motif derived from the data stream, and metadata derived from the data stream.

In an embodiment, the display of the gauge may be overlaid on the display of the time bar. Alternatively, the display of the gauge may be separate from the display of the time bar. Alternatively, the gauge and the time bar may comprise the same GUI element.

Thus, by adapting the sampling rate for different scenes of a video stream according to relevance scores to yield a relevance-weighted thumbnail representation, and mapping the resulting thumbnail representation for uniformly distributed display along the time bar, the user may view a greater portion of relevant thumbnails as opposed to less relevant thumbnails, and which may be useful for searching long videos for a particular feature.

For example, the method above may be applied to evaluate the results of a query-based search. A user may perform a query using a search term and retrieve numerous videos that are associated with the search term. Some of the retrieved videos may have only a fleeting association to the search term, whereas others may be highly relevant to the search term. The method described above may be used to create thumbnail previews for the retrieved videos that are weighted according the relevance of the search term to each respective video. The user can view the thumbnail previews by scrolling across a gauge as described above, to determine the relevance of the corresponding video to the search term. Thus, the user can differentiate between videos that are highly correlated to the search term from videos that are not.

Figure 3:
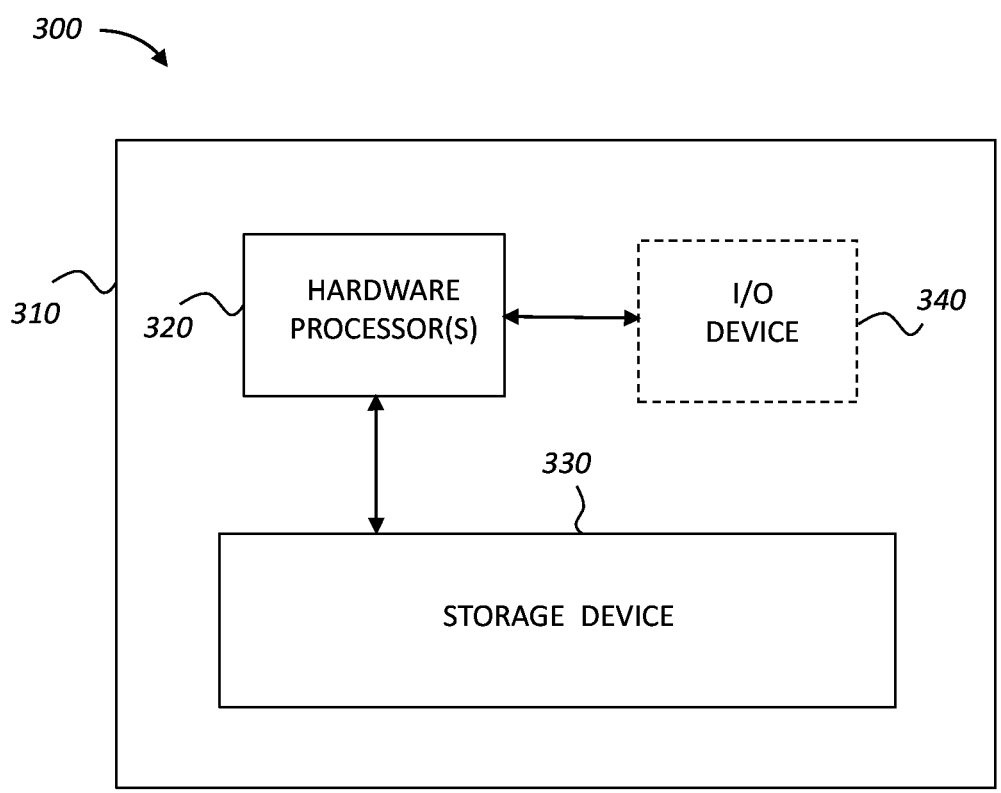
FIG. 3 shows an exemplary system according to an embodiment.

Reference is now made to FIG. 3, which shows an exemplary system 300, according to an embodiment. System 300 may include a computing device 310. Computing device 310 may include a hardware processor 320, a storage device 330 and an optional input/output ("I/O") device 340. Hardware processor 320 may include one or more hardware processors, storage device 330 may include one or more storage devices and I/O device 340 may include one or more I/O devices. Hardware processor 320 may be configured to execute any of the steps of method of FIG. 2. I/O device 340 may be configured to provide and/or receive a data stream, and allow a user to interact with system 300. Dedicated software, implementing the method of FIG. 2 discussed above, may be stored on storage device 330 and executed by hardware processor 320.

In one embodiment, the method of FIG. 2 may be implemented on a single instance of system 300, such as a stand-alone computing device. In another embodiment, the method of FIG. 2 may be implemented on multiple instances of system 300, such as in a client-server configuration. In this embodiment, the steps of the method of FIG. 2 may be divided in any suitable manner over the multiple instances of system 300. For example, a first instance of system 300 may perform the sampling, distributing, and providing and configuring steps of FIG. 2, and the second instance of system 300 may render the provided data stream and representation responsive to an indication by a user.

In some embodiments, computing device 310 may include an I/O device 340 such as a terminal, a display, a keyboard, a mouse, a touch screen, a microphone, an input device and/or the like, to interact with system 300, to invoke system 300 and to receive results. It will however be appreciated that system 300 may operate without human operation and without I/O device 340.

In some exemplary embodiments of the disclosed subject matter, storage device 330 may include and/or be loaded with code for a user interface. The user interface may be utilized to receive input and/or provide output to and from system 300, for example receiving specific user commands and/or parameters related to system 300, providing output, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market site, or to enable others of ordinary skill in the art to understand the embodiments disclosed herein.

What is claimed is:

1. A method for previewing audio or video streams, comprising using at least one hardware processor for:
    segmenting a data stream into a plurality of portions based on one or more user-defined parameters;
    assigning a relevance score to each of said plurality of portions, based on a relevance determination of said portion with respect to said one or more user-defined parameters;
    extracting multiple samples from each of said portions, wherein each portion is sampled at a different sampling rate which corresponds to said relevance score associated with said portion of the data stream;
    using the multiple extracted samples to create a relevance-based weighted summary representation of the data stream, wherein:
    (a) the representation comprises multiple thumbnails, and
    (b) in the representation, in accordance with the relevance scores of said portions: more thumbnails per unit of time of the data stream are included for more relevant portions of the data steam, and less thumbnails per unit of time of the data stream are included for less relevant portions of the data steam, wherein: (i) the data stream is at least one of a video stream and an audio stream, (ii) when the data stream is a video stream, the thumbnails are lower resolution versions of higher resolution frames, the higher resolution frames being the multiple samples extracted from the video stream, and (iii) said one or more user-defined parameters, according to which the relevance scores are assigned to said plurality of portions of the data stream, are at least one of: a visual motif derived from the data stream, and an audio motif derived from the data stream;
    mapping, in accordance with a relevance based mapping scheme, the representation onto a gauge provided with the data stream; and
    displaying one of the multiple thumbnails in accordance with the relevance based mapping scheme, responsive to detecting a navigation indication on the gauge.

2. The method of claim 1, wherein the relevance based mapping scheme uniformly distributes a display of the thumbnails across the length of the gauge.

3. The method of claim 1, further comprising
    indicating, by positioning a progress indicator on a time bar, a timely progression of rendering the data stream on a media reproduction application in accordance with a time based mapping scheme, wherein the time based mapping scheme is different than the relevance based mapping scheme; and, responsive to detecting a selection of the displayed thumbnail,
    rendering the data stream on the media reproduction application starting from a frame of the data stream corresponding to the selected thumbnail, and
    positioning the progress indicator on the time bar at a position corresponding to the time-stamp of the selected thumbnail.

4. The method of claim 3, wherein the gauge is overlaid on the time bar.

5. The method of claim 3, wherein the gauge is separate from the time bar.

6. A computer program product comprising a non-transitory computer-readable storage medium having program code embodied thereon, the program code executable by at least one hardware processor to:

segment a data stream into a plurality of portions based on one or more user-defined parameters;

assign a relevance score to each of said plurality of portions, based on a relevance determination of said portion with respect to said one or more user-defined parameters;

extract multiple samples from each of said portions, wherein each portion is sampled at a different sampling rate which corresponds to said relevance score associated with said portion of the data stream;

use the multiple extracted samples to create a relevance-based weighted summary representation of the data stream, wherein:

(a) the representation comprises multiple thumbnails, and (b) in the representation, in accordance with the relevance scores of said portions: more thumbnails per unit of time of the data stream are included for more relevant portions of the data steam, and less thumbnails per unit of time of the data stream are included for less relevant portions of the data steam, wherein: (i) the data stream is at least one of a video stream and an audio stream, (ii) when the data stream is a video stream, the thumbnails are lower resolution versions of higher resolution frames, the higher resolution frames being the multiple samples extracted from the video stream, and (iii) said one or more user-defined parameters, according to which the relevance scores are assigned to said plurality of portions of the data stream, are at least one of: a visual motif derived from the data stream, and an audio motif derived from the data stream;

map, in accordance with a relevance based mapping scheme, the representation onto a gauge provided with the data stream; and display one of the multiple thumbnails in accordance with the relevance based mapping scheme, responsive to detecting a navigation indication on the gauge.

7. The computer program product of claim 6, wherein the relevance based mapping scheme uniformly distributes a display of the thumbnails across the length of the gauge.

8. The computer program product of claim 6, wherein the program code is further executable to:

indicate, by positioning a progress indicator on a time bar, a timely progression of rendering the data stream on a media reproduction application in accordance with a time based mapping scheme, wherein the time based mapping scheme is different than the relevance based mapping scheme; and, responsive to detecting a selection of the displayed thumbnail, render the data stream on the media reproduction application starting from a frame of the data stream corresponding to the selected thumbnail, and position the progress indicator on the time bar at a position corresponding to the time-stamp of the selected thumbnail.

9. The computer program product of claim 6, wherein the gauge is overlaid on the time bar.

10. The computer program product of claim 6, wherein the gauge is separate from the time bar.

11. A system comprising:

(i) a non-transient storage device having stored thereon instructions for:

segmenting a data stream into a plurality of portions based on one or more user-defined parameters;

assigning a relevance score to each of said plurality of portions, based on a relevance determination of said portion with respect to said one or more user-defined parameters;

extracting multiple samples from each of said portions, wherein each portion is sampled at a different sampling rate which corresponds to said relevance score associated with said portion of the data stream, using the multiple extracted samples to create a relevance-based weighted summary representation of the data stream, wherein:

(a) the representation comprises multiple thumbnails, and (b) in the representation, in accordance with the relevance scores of said portions: more thumbnails per unit of time of the data stream are included for more relevant portions of the data steam, and less thumbnails per unit of time of the data stream are included for less relevant portions of the data steam, wherein: (i) the data stream is at least one of a video stream and an audio stream, (ii) when the data stream is a video stream, the thumbnails are lower resolution versions of higher resolution frames, the higher resolution frames being the multiple samples extracted from the video stream, and (iii) said one or more user-defined parameters, according to which the relevance scores are assigned to said plurality of portions of the data stream, are at least one of: a visual motif derived from the data stream, and an audio motif derived from the data stream;

mapping, in accordance with a relevance based mapping scheme, the representation onto a gauge provided with the data stream, and displaying one of the multiple thumbnails in accordance with the relevance based mapping scheme, responsive to detecting a navigation indication on the gauge; and (ii) at least one hardware processor configured to execute said instructions.

12. The system of claim 11, wherein the relevance based mapping scheme uniformly distributes a display of the thumbnails across the length of the gauge.

13. The system of claim 11, wherein the non-transient storage device further includes instructions for:

indicating, by positioning a progress indicator on a time bar, a timely progression of rendering the data stream on a media reproduction application in accordance with a time based mapping scheme, wherein the time based mapping scheme is different than the relevance based mapping scheme; and, responsive to detecting a selection of the displayed thumbnail, rendering the data stream on the media reproduction application starting from a frame of the data stream corresponding to the selected thumbnail, and positioning the progress indicator on the time bar at a position corresponding to the time-stamp of the selected thumbnail.

14. The system of claim 13, wherein the gauge is overlaid on the time bar.

15. The system of claim 13, wherein the gauge is separate from the time bar.

* * * * *